No. 722,836. PATENTED MAR. 17, 1903.
W. H. GROW.
METHOD OF PROTECTING SURFACES.
APPLICATION FILED AUG. 2, 1902.
NO MODEL.
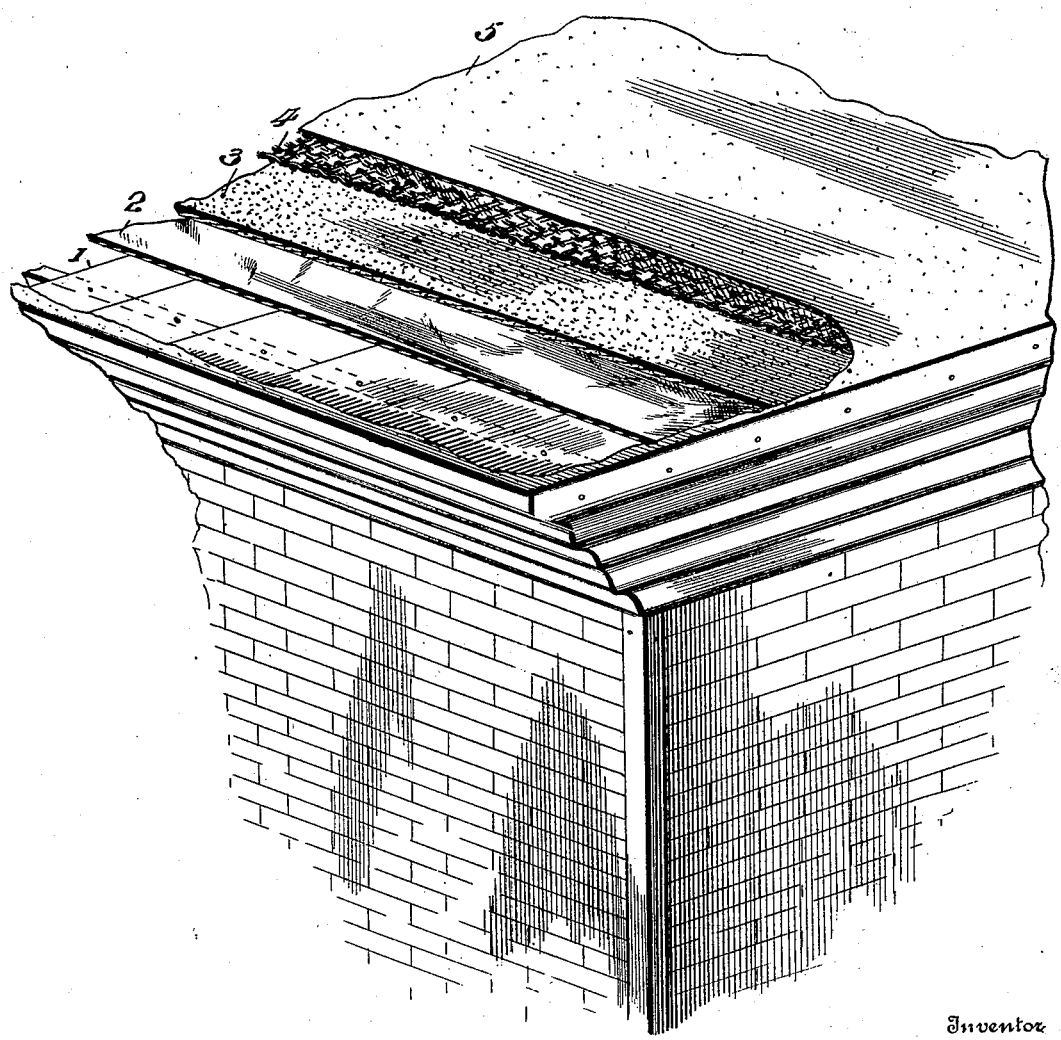
Inventor
W. H. Grow.

UNITED STATES PATENT OFFICE.

WILLIAM H. GROW, OF WINFIELD, KANSAS.

METHOD OF PROTECTING SURFACES.

SPECIFICATION forming part of Letters Patent No. 722,836, dated March 17, 1903.

Application filed August 2, 1902. Serial No. 118,190. (No model.)

*To all whom it may concern:*

Be it known that I, WILLIAM H. GROW, a citizen of the United States, residing at Winfield, in the county of Cowley and State of Kansas, have invented certain new and useful Improvements in Methods of Protecting Surfaces, of which the following is a specification.

This invention relates to a novel method of covering surfaces, such as roofs and walls, to protect them from the weather, being particularly designed for roofs.

In accordance with this invention cement or a self-setting substance is interposed between layers to form a binder and exclude wet, the outer or top layer being burlap or like textile.

The drawing shows a perspective view of a portion of a roof embodying the invention.

The numeral 1 represents the roof, wall, or other surface to be covered or protected. Over this surface a layer or covering 2 is placed and may consist of such material as felt or metal or may be an old roof properly repaired to make it whole. Over this covering 2 is placed a layer of cement 3 or other self setting and hardening substance, the cement being applied either in a dry state or spread after being mixed with water to form a mortar. Burlap 4 or like textile is placed over the cement and pressure applied to cause the cement to enter the meshes or interstices between the thread or strands. The burlap is moistened with water in order to assist in the proper setting of the cement. It is preferred to apply the cement in a dry state, as it can be more evenly and uniformly distributed and at a less expense. After the burlap or textile 4 has been placed in position water in sufficient quantity is applied to thoroughly saturate the cement, which subsequently hardens and sets, the wet of the burlap preventing a too rapid evaporation of the water and insuring a proper setting of the cement, which is essential to the durability and efficiency of the protection afforded the surface. After the cement has set a coating 5, of cement, pitch, paint, or other substance, may be applied to the burlap as a further protection, and when the coat 5 consists of cement the burlap or textile 4 will be embedded in a body of cement and serve as a bond therefor. The outer coat 5 may be covered or finished in any desired way, according to the cost of the protective covering applied to the surface. The layers 1 and 2 may be strips or blocks and may be arranged to break joint or with the joints coinciding, this being immaterial within the purview of the invention.

In case the surface to be protected is perpendicular, or nearly so, it will be necessary to dampen the outer surface of the layer 2 to cause the dry cement to adhere thereto, and the inner surface of the burlap or textile 4 is likewise dampened and the cement applied thereto, after which the burlap is applied and secured to the surface with the cement side against the cement side of the layer 2. Water is applied to the burlap in sufficient quantity to thoroughly wet the cement and cause the layers 2 and 4 to unite, said layers being nailed or otherwise secured to the surface in any convenient way.

Having thus described the invention, what is claimed as new is—

1. The herein-described method of protecting surfaces, the same consisting in applying a layer or cover thereto, then applying a self-setting substance to the outer side of said cover, then placing burlap or textile over the cement and finally wetting the burlap or textile to reduce the cement to a plastic state, whereby the two layers are bound together, the burlap or textile containing the moisture and insuring a proper setting of the cement or like substance, substantially as described.

2. The herein-described method of protecting surfaces, the same consisting of applying a layer or cover thereto, then spreading cement or a self-hardening substance over said cover, then placing burlap or textile over the cement, then wetting the burlap or textile and applying pressure thereto to embed the same into the softened or plastic cement and finally applying a coat to the outer side of the burlap, which latter constitutes a bond between the outer coat and cement, substantially as set forth.

In testimony whereof I affix my signature in presence of two witnesses.

WILLIAM H. GROW. [L. S.]

Witnesses:
R. M. BARNETT,
C. L. GARVER.